(12) United States Patent
Guo et al.

(10) Patent No.: US 8,539,225 B2
(45) Date of Patent: Sep. 17, 2013

(54) METHOD AND DEVICE FOR DYNAMIC DEPLOYMENT OF TRUST BRIDGES IN AN AD HOC WIRELESS NETWORK

(75) Inventors: Liang Guo, Brighton, MA (US); Qi Bao, Westborough, MA (US); Donald E. Eastlake, III, Milford, MA (US); Whay Chiou Lee, Cambridge, MA (US); Anthony R. Metke, Naperville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1322 days.

(21) Appl. No.: 12/112,319

(22) Filed: Apr. 30, 2008

(65) Prior Publication Data

US 2009/0276841 A1    Nov. 5, 2009

(51) Int. Cl.
*H04L 29/06* (2006.01)
(52) U.S. Cl.
USPC ............ 713/156; 726/5; 726/10; 726/12; 726/21
(58) Field of Classification Search
USPC ....................................... 713/156
See application file for complete search history.

(56) References Cited

U.S. PATENT DOCUMENTS

| | | | | |
|---|---|---|---|---|
| 5,745,574 | A * | 4/1998 | Muftic | 713/157 |
| 6,216,231 | B1 * | 4/2001 | Stubblebine | 726/10 |
| 6,865,674 | B1 * | 3/2005 | Mancini et al. | 713/157 |
| 7,068,789 | B2 | 6/2006 | Huitema et al. | |
| 2002/0007346 | A1 | 1/2002 | Qiu et al. | |
| 2002/0012320 | A1 * | 1/2002 | Ogier et al. | 370/252 |
| 2002/0025046 | A1 * | 2/2002 | Lin | 380/282 |
| 2003/0014629 | A1 * | 1/2003 | Zuccherato | 713/156 |
| 2003/0056099 | A1 * | 3/2003 | Asanoma et al. | 713/172 |
| 2003/0130960 | A1 * | 7/2003 | Fraser et al. | 705/75 |
| 2003/0212888 | A1 * | 11/2003 | Wildish et al. | 713/158 |
| 2004/0103275 | A1 * | 5/2004 | Ji et al. | 713/150 |
| 2004/0128544 | A1 * | 7/2004 | Hondo et al. | 713/201 |
| 2005/0144144 | A1 * | 6/2005 | Graff | 705/76 |
| 2007/0248050 | A1 | 10/2007 | Metke et al. | |
| 2007/0283153 | A1 | 12/2007 | Metke et al. | |
| 2008/0046716 | A1 | 2/2008 | Eastlake et al. | |

FOREIGN PATENT DOCUMENTS

WO    2006067503 A1    6/2006

OTHER PUBLICATIONS

Wang et al., Self-managed heterogeneous certification in mobile ad hoc networks, Oct. 2003, IEEE Vehicular Technology Conference 2003, vol. 3, pp. 2137-2141.*

(Continued)

*Primary Examiner* — Taghi Arani
*Assistant Examiner* — Kenneth Chang (57) ABSTRACT

A method for deploying a trust bridge in an ad hoc wireless network can provide interoperability for multi-organizational authentication. The method includes processing at a delegate certification authority (DCA) node device authorizations received from of a plurality of certification authorities (CAs) of different organizations, where the authorizations authorize the DCA node device to serve as a DCA representing the CAs (step 1105). The DCA node device then processes context information received from the ad hoc wireless network (step 1110). Next, the DCA node device determines, based on the context information, that a second node device should be enabled as a new trust bridge (step 1115). The DCA node device then performs a trust bridge deployment to enable the second node device to serve as the new trust bridge (step 1120).

18 Claims, 8 Drawing Sheets

(56) References Cited

OTHER PUBLICATIONS

G. Venkataraman, S. Emmanuel and S. Thambipillai, "Size-restricted Cluster Formation and Cluster Maintenance Technique for Mobile Ad Hoc Networks", International Journal of Network Management, vol. 17, pp. 171-194, Mar. 2007.

V. Welch, I. Foster, et al, "X.509 Proxy Certificates for Dynamic Delegation", 3rd Annual PKI R&D Workshop, 2004.

S. Tuecke, V. Welch, et al. "Internet X.509 Public Key Infrastructure (PKI): Proxy Certificate Profile", Internet RFC 3820, Jun. 2004.

Zhengping, Wu, Alfred C. Weaver, "Using Web Service Enhancements to Bridge Business Trust Relationships," Department of Computer Science University of Virginia, Nov. 2006, XP-002536183, pp. 8.

Alterman, P, "The US Federal PKI and the Federal Bridge Certification Authority," Computer Networks, Elsevier Science Publishers B.V., Amsterdam, NL, vol. 37, No. 6, Dec. 2001, XP004324410, pp. 685-690.

PCT/US2009/039054—EPC International Search Report—Mailed Jul. 21, 2009—14 pages.

International Preliminary Report on Patentability for counterpart International Application No. PCT/US2009/039054 issued on Nov. 2, 2010.

Notice of Allowance mailed on Apr. 8, 2011 for counterpart European Patent Application No. 09739373.0.

* cited by examiner

METHOD AND DEVICE FOR DYNAMIC DEPLOYMENT OF TRUST BRIDGES IN AN AD HOC WIRELESS NETWORK

FIELD OF THE DISCLOSURE

The present invention relates generally to wireless communication networks, and in particular to dynamic deployment of trust bridges in an ad hoc wireless communication network to provide interoperability for multi-organizational authentication.

BACKGROUND

An ad hoc wireless network is a self-configuring and self-healing localized wireless network that is used to enable communication among a plurality of mobile devices. Connectivity to remote databases or networks is made possible through at least one access point that is connected to such resources over a backhaul network. Mobile devices such as cellular phones, personal digital assistants (PDAs) and notebook computers that operate in ad hoc wireless networks often require authentication when communicating with one another, and when accessing remote databases or networks. A trusted communication path can be established between communicating mobile devices, wherein one device may gain trust in another through a sequence of predominantly logical trust steps.

A public key infrastructure (PKI), built upon asymmetric cryptographic systems, can be used to enable mobile devices to authenticate one another. In an asymmetric cryptographic system, encryption and decryption of data are performed using different keys, one of which is kept secret and the other is safely divulged as needed. In a PKI, there is at least one trusted entity, known as a certification authority (CA), which issues data structures (referred to as certificates) that bind specific identities to specific public keys and usage information via digital signatures. The CAs are trusted a priori based on their public keys that are known to be bound to their respective identities in advance. Entities other than CAs may establish trust among themselves by showing one another their respective certificates issued by trusted CAs. There may be a plurality of CAs in a given PKI domain, wherein the CAs may have a hierarchical or a meshed relationship among them. Trust relationships among CAs can be used to build a certification path, which is a chain of certificates where each certificate in the chain is validated by its preceding certificate's public key. A certificate path must terminate with a certificate that has a trusted public key, so that a verifier of the certificate path can verify, using the trusted public key (referred to as a trust anchor of the verifier), a certificate at the other end of the certificate path.

As described above, when a certificate is produced by an entity (referred to as a target) to demonstrate proof of possession of a valid public key, a verifier of the certification needs to construct a certificate path linking the verifier's trust anchor to the certificate. In a multi-organizational environment, where each organization has its own PKI domain, applications supporting inter-organizational security require additional mechanisms to establish cross-organizational trust relationships, since certificate paths normally remain within respective PKI domains.

One method for addressing interoperability issues to support inter-organizational security involves use of cross-certificates, wherein CAs of different organizations cross sign one another's certificates to enable members in one organization to trust all user certificates issued by each cross-certified CA. To avoid scalability issues due to meshed CA cross-certification, a bridge CA may be used to cross sign certificates with each participating CA, such that members of each organization can trust all certificates issued by cross-certified CAs. However, both the above methods are undesirable for establishing inter-organizational trust among disparate organizations that have specific and limited relationships. Such disparate organizations have to rely on predetermined policy constraints on certificate validation, where policy rules may include, for example, constraints on at least one of path length, domain name, and assurance level. Certificate validation therefore can be complicated by policy rules that may be required for large PKI domains.

Figure 1:
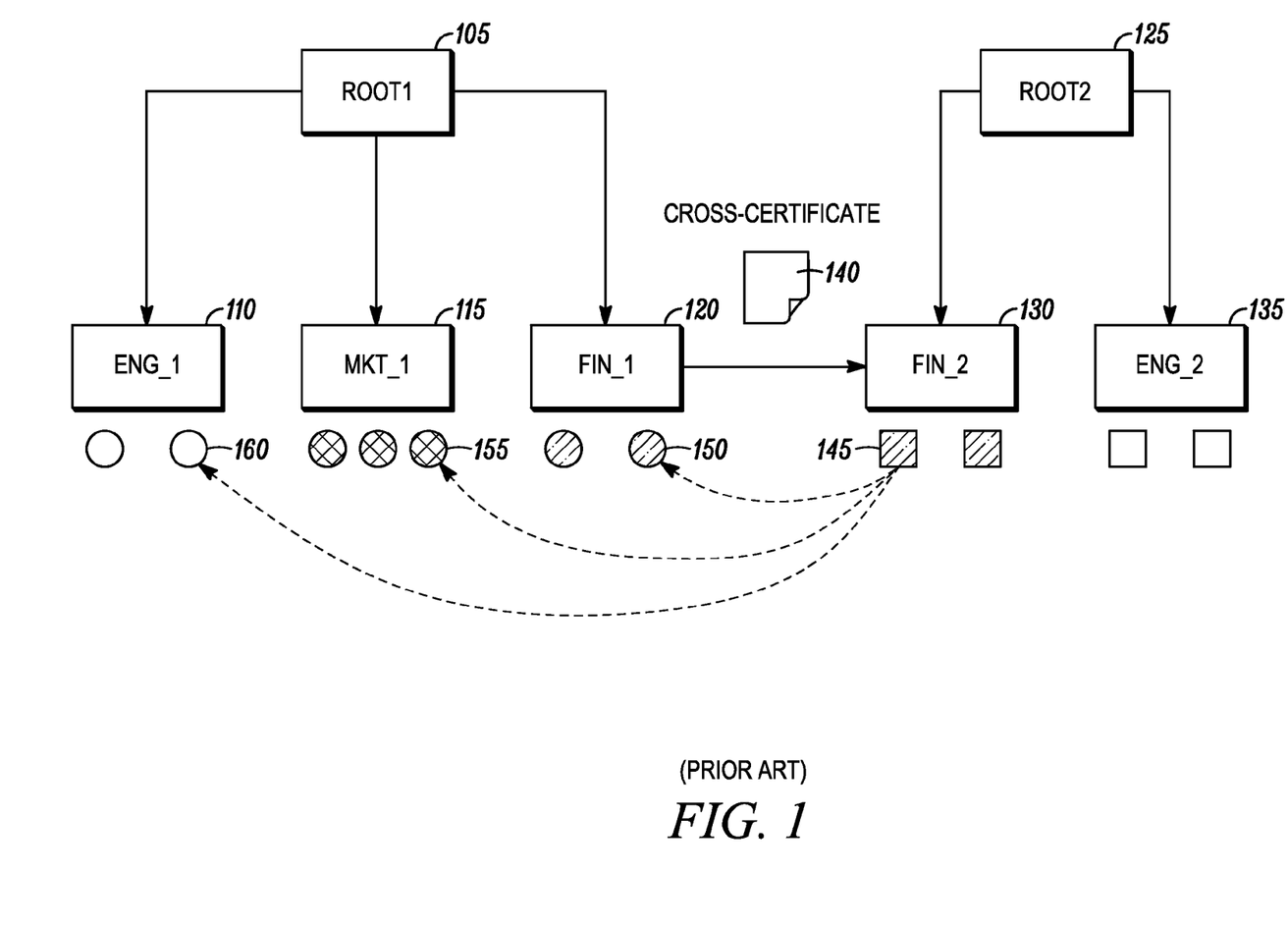
FIG. 1 is a network diagram illustrating a problem with cross-certification techniques, as known according to the prior art.

Referring to FIG. 1, a network diagram illustrates a problem with cross-certification techniques, as known according to the prior art. Consider, for example, that a first organization has a Root1 certification authority (CA) 105 and several subordinate department CAs, including an engineering department Eng_1 CA 110, a marketing department Mkt_1 CA 115, and a finance department Fin_1 CA 120. Consider also that a second organization has a similar CA hierarchy, including, for example, a Root2 certification authority (CA) 125, a finance department Fin_2 CA 130, and an engineering department Eng_2 CA 135.

In order to limit a level of cross-organizational trust between the first and second organizations, consider that Fin_1 CA 120 issues a cross-certificate 140 to Fin_2 CA 130 wherein the cross-certificate is a certificate of Fin_2 CA 130 cross-signed by Fin_1 CA 120. A user 145 in the finance department of the second organization may thus use the cross-certificate 140 to gain the trust of a user 150 in the finance department of the first organization. However, the cross-certificate 140 may not effectively prevent the user 145 in the finance department of the second organization from also gaining the trust of the engineering and marketing departments of the second organization. That is because a user 155 in the marketing department and a user 160 in the engineering department of the second organization are not limited to using only the Eng_1 CA 110 and the Mkt_1 CA 115 as trust anchors. In addition, the users 155, 160 also can use the Root1 CA 105 as a trust anchor. The cross-certificate 140 thus creates a valid certificate path from the Root1 CA 105, to the Fin_1 CA 120, to the Fin_2 CA 130.

To overcome the above described problem of abuse of cross-organizational trust, one method includes policy constraints on certificate validation. For example, in addition to issuing cross-certificates at subordinate CAs, a policy statement is provided between each hierarchically superior CA and subordinate CA to control a range of security domains defined by each cross-certificate. Such a policy statement may indicate, for example, that an associated cross-certificate cannot be used to validate a level of trust beyond a security domain subordinate to Fin_1 CA 120. For example, referring again to FIG. 1, to prevent the cross-certificate 140 from being used to establish trust between the user 155 in the marketing department of the first organization and the user 145 in the finance department of the second organization, a policy statement would be required between the Root1 CA 105 and the Fin_2 CA 130.

According to another method, a trust bridge (TB) is used to establish an inter-organizational trust link where a sequence of logical trust steps crosses an organizational boundary. A TB is a device that has been configured with a predetermined set of trust anchors associated with a plurality of organizations with autonomous security domains, and a certificate signed by each of the trust anchors. A device affiliated with an organization may issue a request to a TB in order to bridge authentication between that organization and another organization. A TB must have acquired a certificate from a CA of each participating organization, so that the TB can be trusted by, and can authenticate, relying parties (i.e., certificate verifiers) from different participating organizations. A TB then can assist two relying parties to establish a session key to be used to encrypt data subsequently exchanged between the relying parties. A TB can also assist one relying party to verify authenticity of a message sent by another relying party. A TB also can be responsible for maintaining a status of a certification revocation list, which is a record of certificates that have been revoked.

There exist several methods to enable relying parties to discover candidate TBs that can bridge their corresponding organizations. These methods enable advertising and discovery of devices that can provide such bridged trust services over an ad hoc wireless network. Compared to the methods of cross-certification and bridged CA as described above, trust bridge based methods can offer increased flexibility in range control, without a burden of complicating backhaul CA relationship topology. However, a trust bridge can be another target for security attack in a trust chain. Moreover, the task of bridging trust can be computationally intensive as trust bridges may need to handle certificate management for all organizations participating in a network.

Accordingly, there is a need for an improved method and device for deploying trust bridges in an ad hoc wireless network to provide interoperability for multi-organizational authentication.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method for deploying a trust bridge in an ad hoc wireless network provides interoperability for multi-organizational authentication. The method includes processing at a special node device, referred to as a delegate certification authority (DCA) node device, authorizations received from a plurality of certification authorities (CAs) of different organizations, wherein the authorizations authorize the DCA node device to serve as a DCA representing the CAs. Next, the DCA node device processes context information received from the ad hoc wireless network. The DCA node device then determines, based on the context information, that a second node device should be enabled as a new trust bridge. The DCA node device then performs a trust bridge deployment to enable the second node device to serve as the new trust bridge.

Embodiments of the present invention thus can be used to minimize a number of enabled trust bridges operating in an ad hoc wireless network. Devices deployed, for example, at an incident scene such as a large urban fire or natural disaster site, are able to establish through enabled trust bridges cross-organizational trust with other devices as allowed by a current trust policy, and each enabled trust bridge is not overloaded with trust bridging information overhead. Also, a minimum number of trust anchors can be configured at each enabled trust bridge, and a lifetime of a bridge assisted transitive trust can be limited to avoid abuse of cross-organizational trust. By separating cross-organizational trust management from an execution of bridged trust, a DCA node device is not required to handle high loads of trust bridging, which may be computationally intensive. Further, a DCA node device may be the only device in a network that requires high security protection, because security breaches at other node devices will likely affect a smaller number of node devices.

According to some embodiments of the present invention, a delegate certification authority (DCA) node device is dispatched to a multi-organizational networking environment, such as an incident scene area, to collect appropriate intelligence on the multi-organizational networking environment. The DCA node device then uses such intelligence to strategically enable a number of existing network node devices to serve as trust bridges. The DCA node device thus serves as an inter-organizational certification authority (CA) having limited authority, and can also serve as a mobile trust bridge. An existing node device operating in a multi-organizational networking environment may also be individually authorized by each of a plurality of CAs from different organizations to serve as a DCA node device.

After being enabled by a DCA node device, a trust bridge can monitor a local network topology and an organizational membership of each reachable node device within range of the trust bridge. Trust bridges can also exchange collected information with other trust bridges (including the DCA node device), and such exchanged information can be used to collaboratively and dynamically optimize deployment of trust bridges in a network. Further, if multi-organizational networking environment is large, a plurality of DCA node devices can be dispatched, and they can coordinate among themselves to enable selected network devices to operate as trust bridges.

A DCA node device can include a set of trust anchors, where each trust anchor in the set corresponds to a participating organization in a predetermined set of organizations, and a corresponding set of bridging certificates signed respectively by each trust anchor. With the trust anchors and bridging certificates, the DCA node device can authenticate and be trusted by devices from the different organizations in the predetermined set of organizations. Further, the DCA node device itself can also function as a master trust bridge, which can serve as a trust bridge between any pair of organizations selected from the predetermined set of organizations.

A DCA node device can include a proxy certificate that is granted by a CA of each organization in the predetermined set of organizations. The DCA node device is thus delegated an authority to provide a limited proxy CA service on behalf of a CA. Such a proxy certificate, referred to herein as a DCA-authorizing certificate, is granted by a CA of an organization to a candidate DCA node device and serves to bind a unique public key of the candidate DCA node device, within a multi-organizational networking environment of the candidate DCA node device, to its identity. A predetermined set of delegation policies approved by the CAs are also included in the DCA-authorizing certificate.

According to some embodiments of the present invention, a DCA node device can be preconfigured for dispatch during a pre-planning phase, or can assume a delegation after arriving at a particular incident scene. For each participating organization, a DCA node device first authenticates itself to that organization by, for example, connecting to a backhaul CA of that organization through backhaul connectivity (e.g., through a registration authority at a network service station), and requests a certificate for proxy service and an associated proxy public/private key pair. The backhaul CA (i.e., the issuer of the proxy certificate) is required to create a proxy public/private key pair for the DCA node device, so that the backhaul CA has better control over usage of the DCA-authorizing certificate. Strength of the keys used can be context dependent, and the DCA-authorizing certificate may contain attributes that define policy related constraints such as, for example, a user rank and security level.

Figure 2:
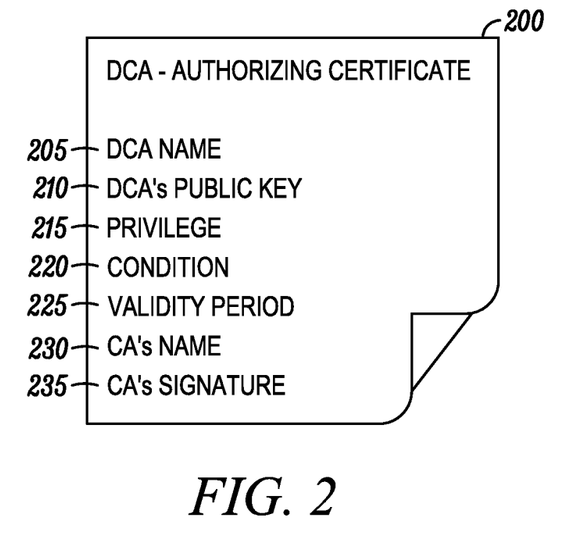
FIG. 2 is a diagram illustrating contents of a delegate certification authority (DCA)-authorizing certificate, according to some embodiments of the present invention.

Referring to FIG. 2, a diagram illustrates contents of a DCA-authorizing certificate 200, according to some embodiments of the present invention. For example, the DCA-authorizing certificate 200 includes a DCA name field 205, a DCA public key field 210, a privileges field 215, a conditions field 220, a validity period field 225, a CA name field 230, and a CA signature field 235.

Figure 3:
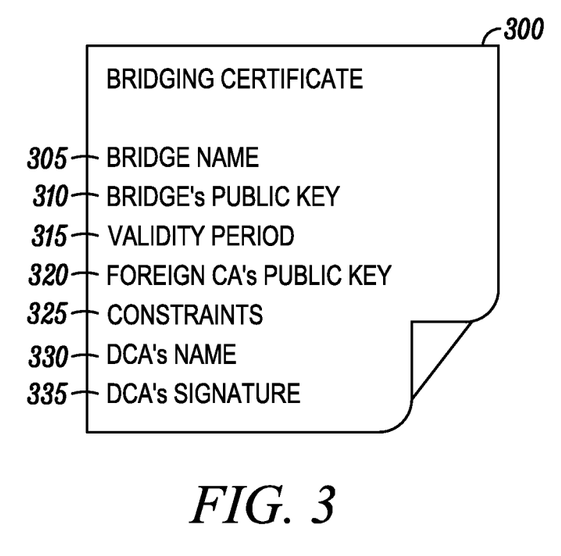
FIG. 3 is a diagram illustrating contents of a bridging certificate, according to some embodiments of the present invention.

Referring to FIG. 3, a diagram illustrates contents of a bridging certificate 300, according to some embodiments of the present invention. For example, the bridging certificate 300 includes a bridge name field 305, a bridge public key filed 310, a validity period field 315, a foreign CA public key field 320, a constraints field 325, a DCA name field 330, and a DCA signature field 335.

A validity period of trust from an organization CA to a DCA node device, such as included in the validity period field 225 of the DCA-authorizing certificate 200, can be defined by a timestamp. The validity period of any trust bridge enabled by a DCA node device, such as included in the validity period field 315 of the bridging certificate 300, also can be defined by a timestamp. The validity period defined by a bridging certificate then must be within the validity period of a corresponding DCA-authorizing certificate.

Figure 4:
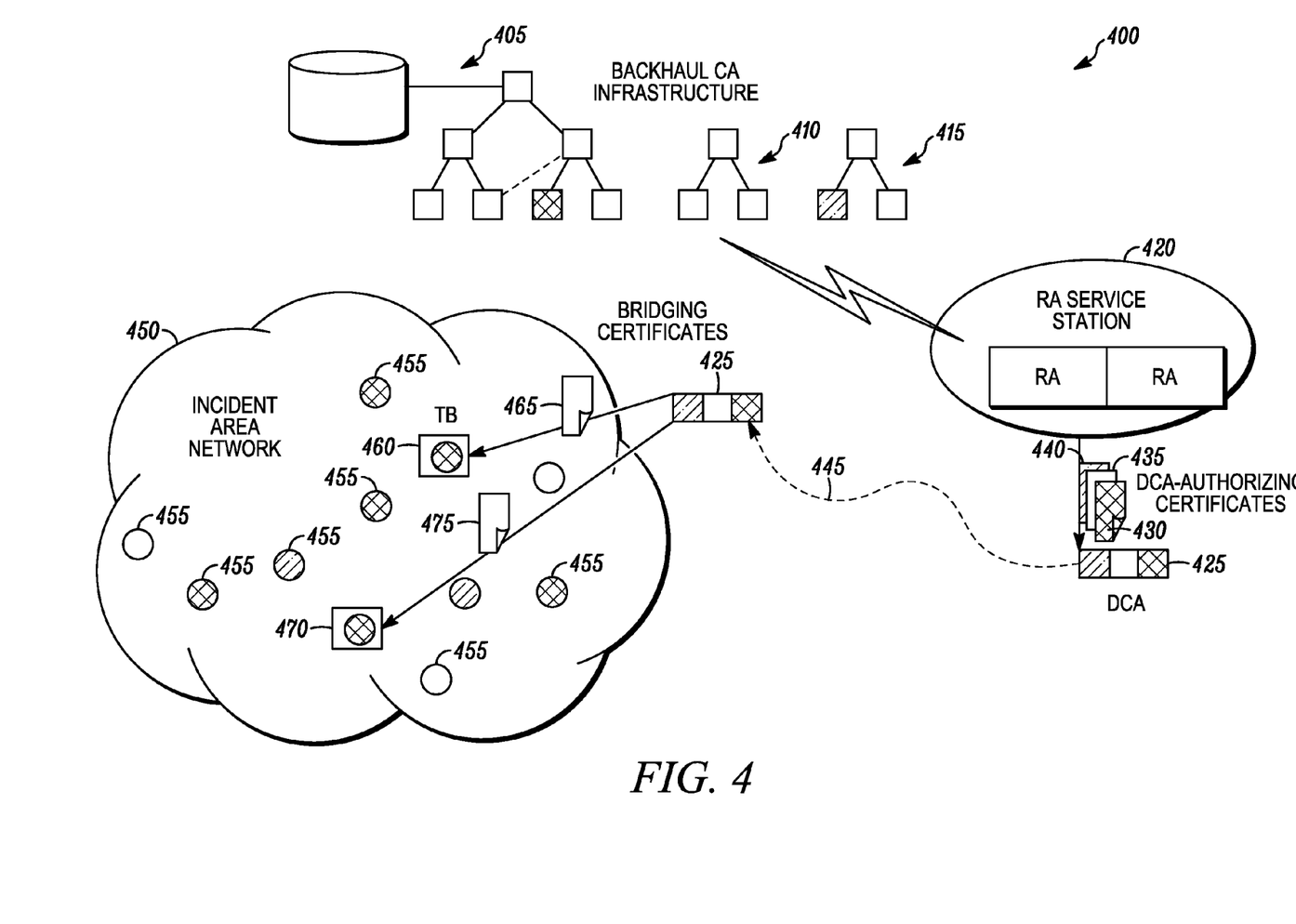
FIG. 4 is a network diagram illustrating a method for deploying trust bridges in an ad hoc wireless network, such as an incident area network, to provide interoperability for multi-organizational authentication, according to some embodiments of the present invention.

Referring to FIG. 4, a network diagram illustrates a method for deploying trust bridges in an ad hoc wireless network 400 to provide interoperability for multi-organizational authentication, according to some embodiments of the present invention. As illustrated, a first organization certification authority (CA) 405 from a first organization, a second organization CA 410 from a second organization, and a third organization CA 415 from a third organization, are each in communication with a corresponding Registration Authority (RA) at a network service station 420, wherein an RA is an authority in a network that verifies user requests for a digital certificate and tells the certificate authority (CA) to issue it. A delegate certification authority (DCA) node device 425 is also in communication with the RAs in the network service station 420. Therefore, through the RAs, each of the CAs 405, 410, 415 transmits authorizations to the DCA node device 425, where the authorizations authorize the DCA node device 425 to serve as a DCA representing the CAs 405, 410, 415.

The authorizations transmitted to the DCA node device 425 are in the form of a DCA-authorizing certificate 430 from the first organization CA 405, a DCA-authorizing certificate 435 from the second organization CA 410, and a DCA-authorizing certificate 440 from the third organization CA 415. For example, the DCA-authorizing certificates 430, 435, and 440 may be in the form of the DCA-authorizing certificate 200 shown in FIG. 2. The DCA node device 425 therefore becomes a proxy CA of the first, second, and third organizations.

Next, as represented by line 445, the DCA node device 425 moves to within radio frequency (RF) range of an ad hoc wireless network 450 operating at a multi-organizational networking environment. The DCA node device 425 then processes context information received from the ad hoc wireless network 450. Such context information can include, for example, network state information including attributes of various node devices 455, from the three organizations represented by the CAs 405, 410, 415, which are operating in the ad hoc wireless network 450. The context information may also include network topology data and one or more bridging requests received from the various node devices 455. Based at least in part on the context information, the DCA node device 425 can determine that a second node device, such as one of the various node devices 455, is authorized to function as a trust bridge and should be enabled as a new trust bridge 460. Finally, the DCA node device 425 performs a trust bridge deployment, including transmission to the new trust bridge 460 of a bridging certificate 465, to enable the second node device to serve as the new trust bridge 460. For example, the bridging certificate 465 can be in the form of the bridging certificate 300 shown in FIG. 3.

Similarly, based at least in part on the context information and the needs of the ad hoc network, the DCA node device 425 can also enable a third node device, such as one of the various node devices 455, to serve as a new trust bridge 470.

The DCA node device 425 will therefore transmit a bridging certificate 475 to the new trust bridge 470. Each new trust bridge 460, 470 can then install trust anchors associated with the CAs 405, 410, 415. For example, consider that the trust bridge 460 concerns a node device that was originally associated with the first organization CA 405. When being deployed as a trust bridge, the trust bridge 460 will therefore install trust anchors associated with the second organization CA 410 and the third organization CA 415. Such trust anchors will include the bridging certificate 465 and the DCA-authorizing certificates 435, 440, respectively. The trust bridge 460 is then enabled to provide service to bridge its original organization associated with the first organization CA 405, and the foreign organizations associated with the second organization CA 410 and the third organization CA 415. The various node devices 455 from the three different organizations represented by the three CAs 405, 410, 415 are therefore able to obtain effective interoperability, enabling them all to communicate with each other, in the ad hoc wireless network 450.

It is generally not required that the DCA node device 425 create a proxy key pair for each new trust bridge 460, 470 since it is generally adequate for each new trust bridge 460, 470 to use its own private key to provide a bridging service.

Figure 5:
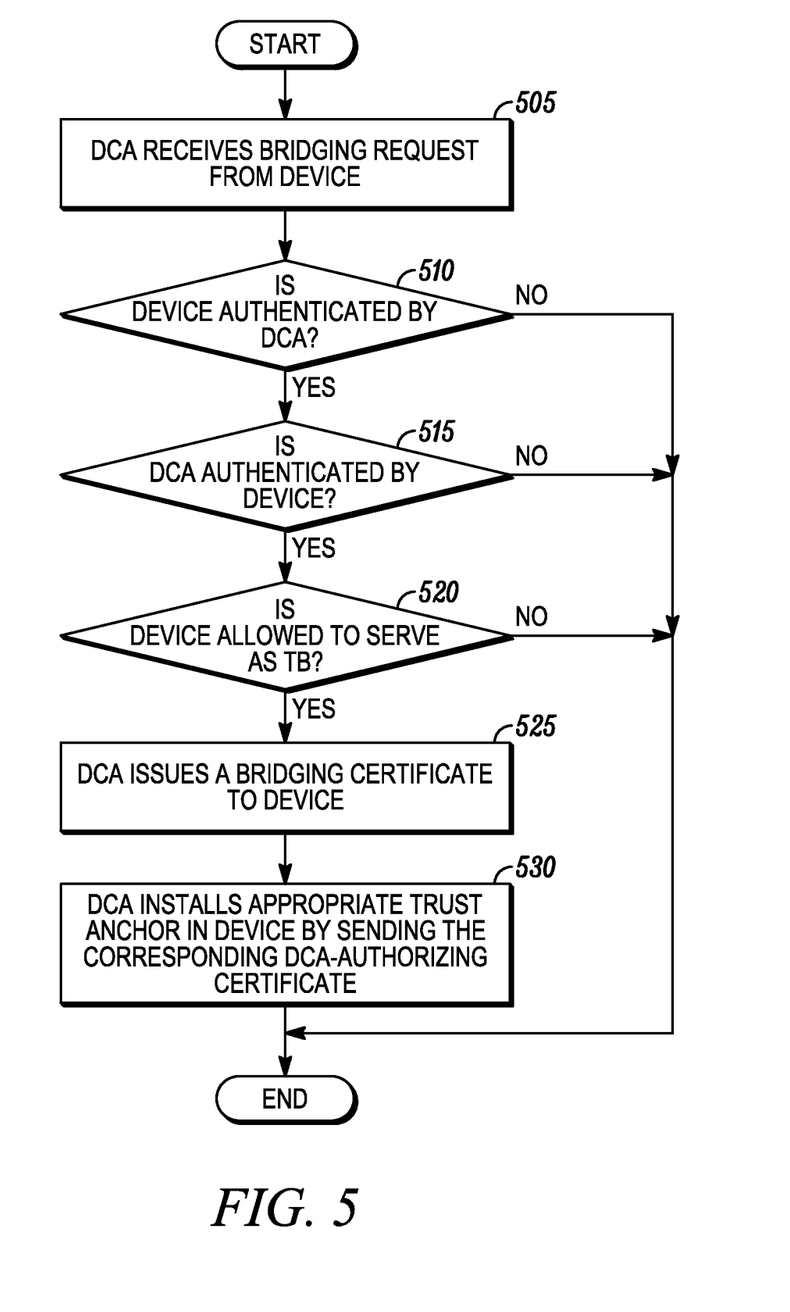
FIG. 5 is a general flow diagram illustrating a process for deploying a trust bridge in an ad hoc wireless network, according to some embodiments of the present invention.

Referring to FIG. 5, a general flow diagram illustrates a process for deploying a trust bridge in an ad hoc wireless network, according to some embodiments of the present invention. At step 505, a delegate certification authority (DCA) node device, such as the DCA node device 425, receives a bridging request from a requesting node device, such as a device associated with the new trust bridge 460.

At step 510, it is determined at the DCA node device whether the requesting node device has been authenticated by the DCA node device. If not, the process ends. When it is determined that the requesting node device has been authenticated by the DCA node device, then at step 515 it is determined whether the DCA node device has been authenticated by the requesting node device. If not, the process ends. When it has been determined that the DCA node device has been authenticated by the requesting node device, then at step 520 it is determined whether the requesting node device is allowed to serve as a trust bridge. If not, the process ends. When it is determined that the requesting node device is allowed to serve as a trust bridge, at step 525 the DCA node device issues a bridging certificate to the requesting node device. Finally, at step 530, the DCA node device installs a set of appropriate trust anchor(s) in the requesting node device by transmitting a corresponding DCA-authorizing certificate(s) to the requesting node device. As will be understood by those having ordinary skill in the art, after the process ends it may be restarted at any time when a new bridging request is received.

Figure 6:
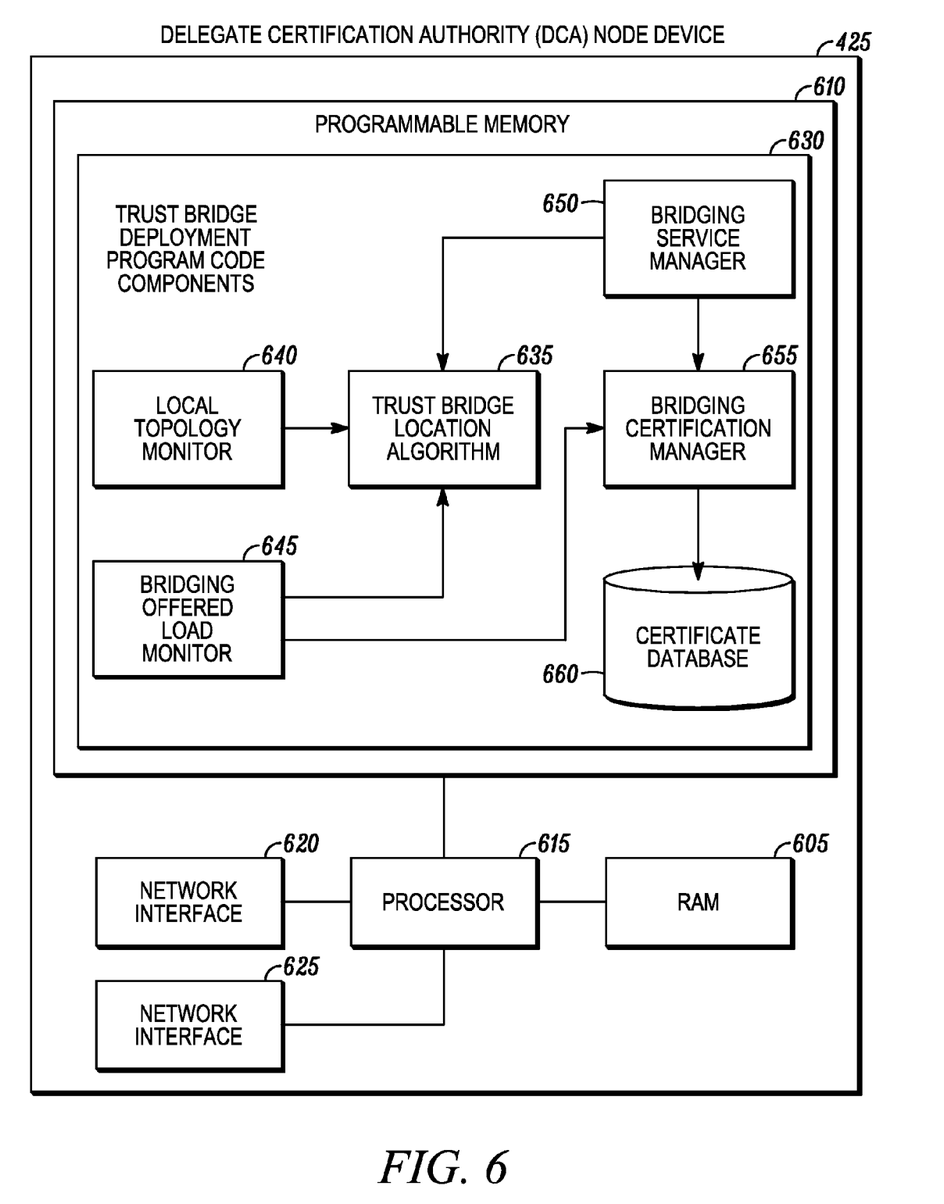
FIG. 6 is a block diagram illustrating components of a delegate certification authority (DCA) node device, according to some embodiments of the present invention.

Referring to FIG. 6, a block diagram illustrates components of a delegate certification authority (DCA) node device, such as the DCA node device 425, according to some embodiments of the present invention. The DCA node device 425 comprises a random access memory (RAM) 605 and a programmable memory 610 that are coupled to a processor 615. The processor 615 also has ports for coupling to wireless network interfaces 620, 625. The wireless network interfaces 620, 625 can be used to enable the DCA node device 425 to communicate with other node devices in an ad hoc wireless network or mesh network, such as the ad hoc wireless network 450. For example, the DCA node device 425 can communicate with the new trust bridge 460 using the wireless network interface 620 to receive and route data packets.

The programmable memory 610 can store operating code (OC) for the processor 615 and code for performing functions associated with a DCA node device. For example, the programmable memory 610 can comprise trust bridge deployment computer readable program code components 630 configured to cause execution of a method for deploying a trust bridge in an ad hoc wireless network as described herein.

Examples of functional blocks of the computer readable program code components 630 include a trust bridge location algorithm 635 that receives input from a local network topology monitor 640, a bridging offered load monitor 645, and a bridging service manager 650. The local topology monitor 640 and the bridging offered load monitor 645 collect information to enable the trust bridge location algorithm 635 to adaptively enable and disable trust bridges in a network, based on changing demand. The bridging offered load monitor 645 and the bridging service manager 650 also provide data to a bridging certification manager 655 that monitors data such as certificate validity periods, assignments of certificates, and certificate renewals. To facilitate certificate management, the bridging certification manager 655 also records active bridging certificate information in a certificate database 660.

The trust bridge location algorithm 635 can be used to minimize a number of enabled trust bridges operating in a network, while still maintaining adequate interoperability between various organizations operating at an incident scene. For example, an adequate number of trust bridges should be enabled so that it is possible to establish an acceptable trust path between each pair of node devices operating at an incident scene, while no trust bridge should be overloaded with trust bridging information overhead.

According to some embodiments of the present invention, a pre-determined number of node devices can be selected as candidate trust bridges during a pre-planning phase. For example, initial selection of node devices can be based on pre-deployment physical or security properties of the devices. Thus a device may be qualified to function as a trust bridge if it has adequate power and computing resources, is within a communication range of a large number of other devices, or has a high trust/security level. For example, in a fire-fighting scenario, devices located in fire engines may be more powerful than handheld devices, and thus may be more qualified to be selected as candidate trust bridges.

A number of devices that are selected as candidate trust bridges can be set to facilitate load balancing, so that no enabled trust bridge needs to handle an excessive offered load of trust establishment requests. For example, a number of candidate trust bridges can be a function of a number of devices in each distinct organization in a set of organizations that may operate in a particular network. For example, where there are two organizations, a number of candidate trust bridges can be set to be proportional to a product of a total number of devices from each respective organization.

A delegate certification authority (DCA) node device thus can be preconfigured with the identities of candidate trust bridges, and with respective trust bridging policy constraints. For example, such constraints may include a permission to function as a trust bridge for only a particular organization. Alternatively, each candidate trust bridge can be preconfigured with a certificate that indicates that the candidate trust bridge is permitted, based on a predetermined policy, to serve as a trust bridge for a predetermined list of organizations. Then, upon deployment of the candidate trust bridges, a DCA node device dynamically allocates appropriate bridging certificates, and an appropriate validity period for each bridging certificate, according to policies and periodic updates of physical or security properties forwarded to the DCA node device by the candidate trust bridges. This allows the candidate trust bridges to be enabled dynamically.

According to still other embodiments of the present invention, candidate trust bridges can be dynamically determined by a facility location algorithm based on dynamic topology information. That enables a selected trust bridge to be centrally located relative to a group of node devices to which the trust bridge provides bridging services. Each node device in a network can announce a set of organization identities with which it seeks to establish trust. For each set of devices that have announced a given organization identity, a logical topology is constructed that connects the set of devices with a set of links, each assigned a link weight. For example, a link weight can be derived from a hop count. Next, a "center" set of the devices that are to be deployed as trust anchors is determined. When a number of devices using the trust bridging services becomes large enough that additional trust bridges are required, a dynamic clustering and cluster-head election algorithm can be used to create multiple size-restricted clusters, where each cluster shares a trust bridge located at a central cluster-head device. Such dynamic clustering and cluster-head election algorithms are well known to those having ordinary skill in the art. For example, see G. Venkataraman, S. Emmanuel and S. Thambipillai, "Size-restricted Cluster Formation and Cluster Maintenance Technique for Mobile Ad Hoc Networks", International Journal of Network Management, Vol. 17, pages 171-194, March 2007, which is hereby incorporated by reference in its entirety herein.

The dynamic clustering and cluster-head election algorithm ensures that each node device in a network has access to one or more trust bridges that can collectively serve all necessary bridging requirements, while minimizing a hop-count to the furthest trust bridges. For example, such an algorithm can be centralized at a DCA node device, if the DCA node device has a global view of a relevant network topology. Otherwise, the algorithm can be distributed throughout the network.

According to still other embodiments of the present invention, each node device in an ad hoc wireless network can be selected to serve as a trust bridge. A DCA node device then becomes a default bridging device for all inter-organization pairs. The DCA node device thus keeps track of identities of requesting organizations. If a particular pair appears very often (e.g., above a predetermined threshold), the DCA node device may grant bridging functionality to a node device that is close to a center of all requests of a given type. The node device with such bridging functionality then intercepts all bridging requests and takes over bridging responsibility for that particular pair of organizations. Such functionality is described in more detail below.

Figure 7:
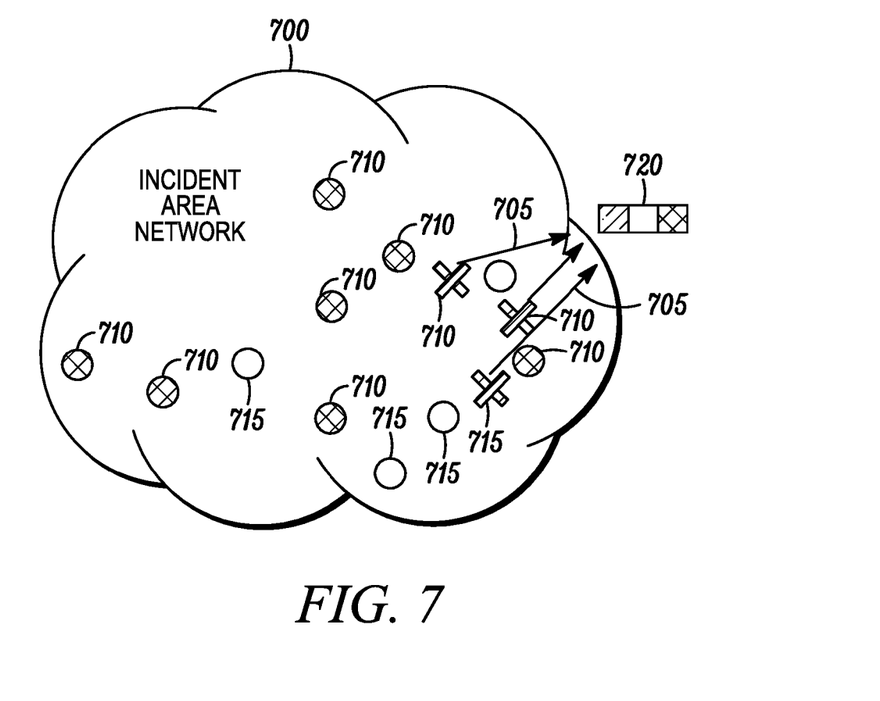
FIG. 7 is a network diagram illustrating bridging requests transmitted in an incident area network by devices from a first organization and devices from a second organization, and a subsequent deployment of trust bridges, according to some embodiments of the present invention.
Figure 8:
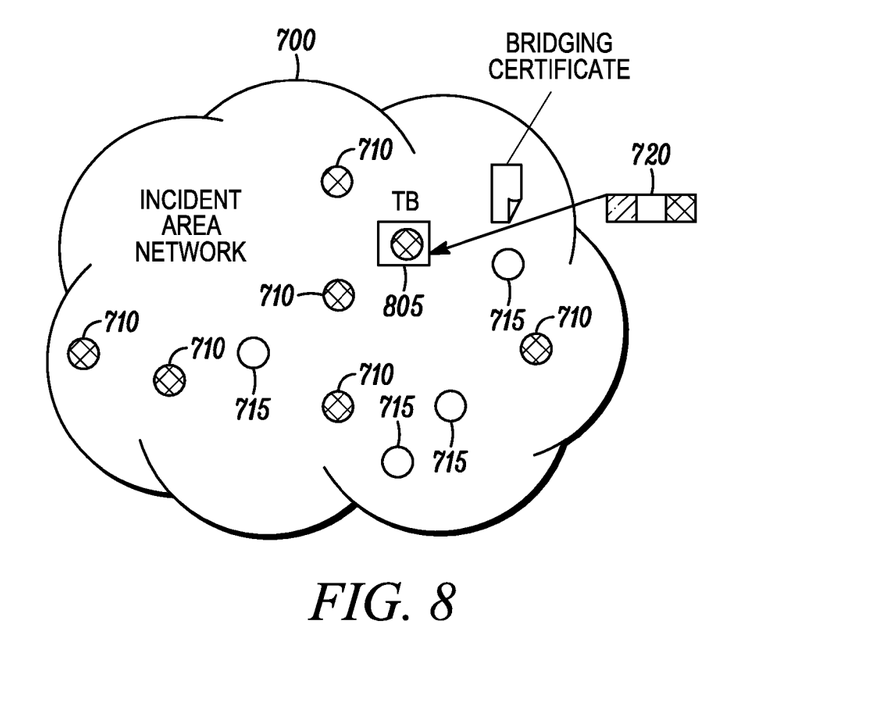
FIG. 8 is a network diagram illustrating further developments in the network shown in FIG. 7.

Referring to FIGS. 7, 8, 9 and 10, sequential network diagrams illustrate bridging requests 705 transmitted in an incident area network 700 by devices 710 from a first organization, and by devices 715 from a second organization, and a subsequent deployment of trust bridges, according to some embodiments of the present invention. As shown in FIG. 7, the bridging requests 705 are first transmitted to a DCA node device 720. However, as shown in FIG. 8, when a number of bridging requests reaches a predetermined limit, the DCA node device selects a particular device to function as a new trust bridge 805. The new trust bridge 805 then monitors and intercepts any bridging request sent to the DCA node device 720, and also takes over the bridging functionality of authentication and key generation.

Figure 9:
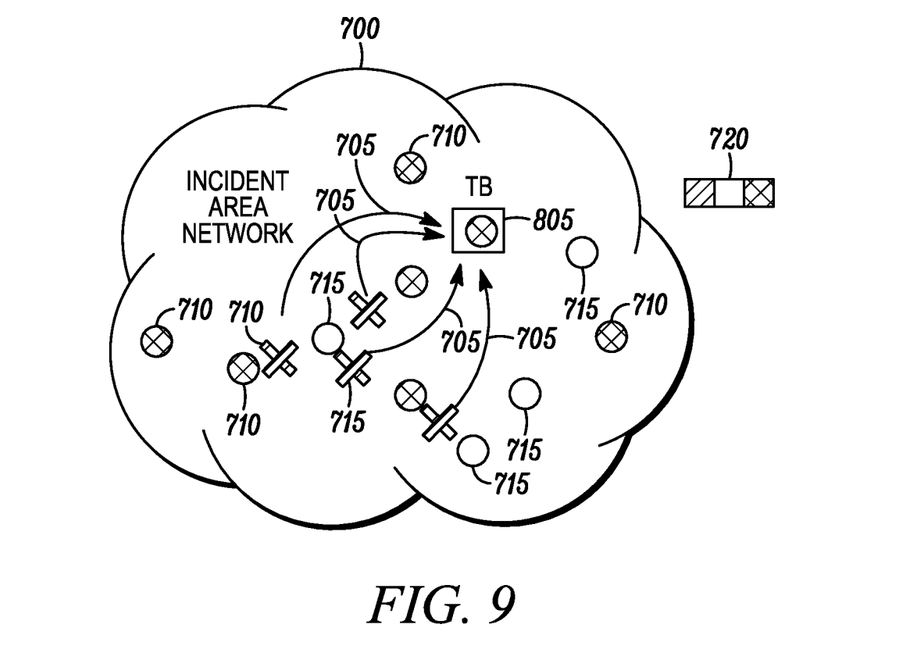
FIG. 9 is a network diagram illustrating further developments in the network shown in FIG. 8.
Figure 10:
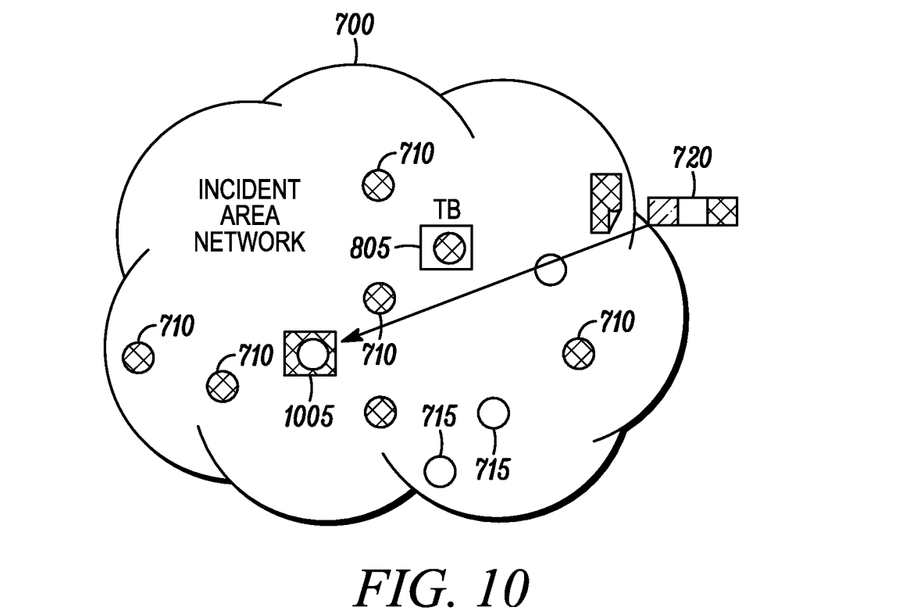
FIG. 10 is a network diagram illustrating further developments in the network shown in FIG. 9.

Next, referring to FIGS. 9 and 10, if it becomes evident that the new trust bridge 805 is becoming overloaded, the DCA node device 720 may select another device to function as another new trust bridge 1005. The new trust bridge 1005 then shares some of the bridging services load with the other new trust bridge 805. As shown, the new trust bridge 1005 may be located in an area close to where a large number of the bridging requests 705 shown in FIG. 9 are originating.

For security reasons, a number of trust bridges active in a multi-organizational networking environment should generally be minimized. Maintaining idle or unnecessary trust bridges not only consumes network resources, but also can increase risks of bridging service abuse. Attempts to manage such risks may also include a use of short validity periods for bridging services. An active status of unused trust bridges will then eventually expire. Also, trust bridges that anticipate having long term usage requirements may request extensions of their respective validity periods. Alternatively, a DCA node device may selectively extend the validity period of bridging services for various trust bridges. Such selective extensions may take into consideration an offered load of bridging requests, so that an adequate number of active trust bridges are maintained to share an offered load.

Figure 11:
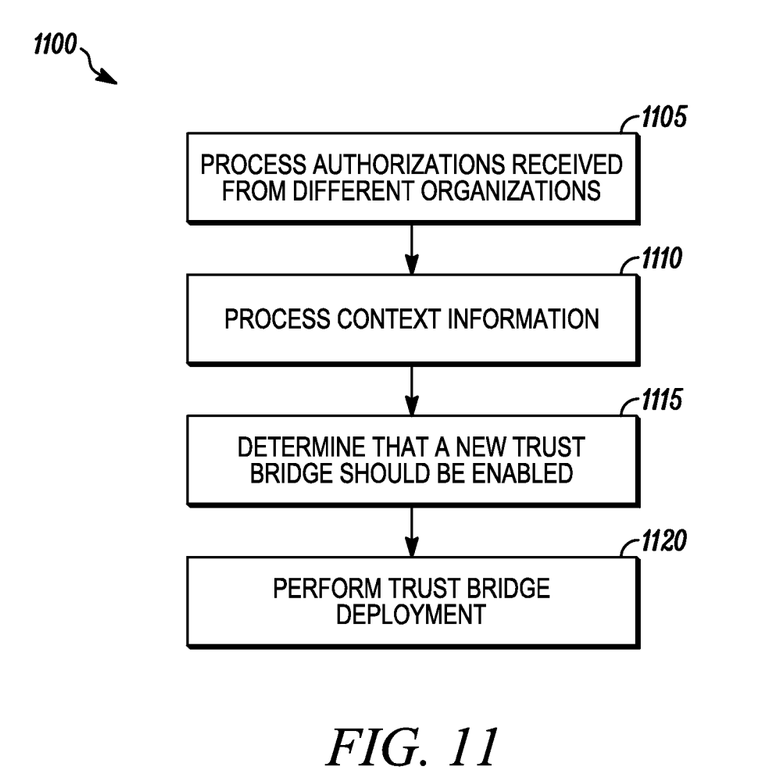
FIG. 11 is a general flow diagram illustrating a method 1100 for deploying a trust bridge in an ad hoc wireless network to provide interoperability for multi-organizational authentication, according to some embodiments of the present invention.

Referring to FIG. 11, a general flow diagram illustrates a method 1100 for deploying a trust bridge in an ad hoc wireless network to provide interoperability for multi-organizational authentication, according to some embodiments of the present invention. At step 1105, a delegate certification authority (DCA) node device processes authorizations received from of a plurality of certification authorities (CAs) of different organizations, wherein the authorizations authorize the DCA node device to serve as a DCA representing the CAs. For example, as shown in FIG. 4, authorizations are provided to the DCA node device 425 in the form of the DCA-authorizing certificates 430, 435, 440.

At step 1110, the DCA node device processes context information received from the ad hoc wireless network. For example, as shown in FIG. 4, the DCA node device 425 processes network topology information concerning the ad hoc wireless network 450.

At step 1115, the DCA node device determines, based on the context information, that a second node device should be enabled as a new trust bridge. For example, the DCA node device 425 determines that one of the various node devices 455 should be enabled as the new trust bridge 460.

Finally, at step 1120, the DCA node device performs a trust bridge deployment to enable the second node device to serve as the new trust bridge. For example, the DCA node device 425 transmits to the new trust bridge 460 the bridging certificate 465 and at least some of the DCA-authorizing certificates 430, 435, 440.

Advantages of some embodiments of the present invention therefore include enabling, in an ad hoc wireless network, an efficient and dynamic deployment of trust bridges. An adaptive number of trust bridges therefore can be strategically deployed and configured to establish trust among organizations actually involved in an incident scene response, where each trust bridge will not be overloaded with bridging information overhead, such as negative constraints on cross-certificates. Overall interoperability of network device therefore can be improved. Moreover, risks concerning abuse of ad hoc transitive trust between network node devices can be reduced by minimizing a number of bridging devices, minimizing a number of bridging certificates, and minimizing the validity period of bridging services.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . ." does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for deploying a trust bridge in an ad hoc wireless network, the method comprising:
   processing at a delegate certification authority (DCA) node device authorizations received from of a plurality of certification authorities (CAs) of different organizations, wherein the authorizations authorize the DCA node device to serve as a DCA representing the CAs;
   processing at the DCA node device context information received from the ad hoc wireless network;
   determining at the DCA node device, based on the context information, that a second node device should be enabled as a new trust bridge, wherein the trust bridge operates to provide interoperability for multi-organizational authentication;
   performing at the DCA node device a trust bridge deployment to enable the second node device to serve as the new trust bridge;
   wherein the trust bridge deployment comprises:
   authenticating the second node device at the DCA node device;
   determining at the DCA node device that the second node device has authenticated the DCA node device;
   determining at the DCA node device that the second node device is authorized to function as the trust bridge;
   transmitting a bridging certificate from the DCA node device to the second node device; and
   transmitting a DCA-authorizing certificate from the DCA node device to the second node device, whereby the second node device is authorized to function as the trust bridge in the ad hoc wireless network.

2. The method of claim 1, wherein the bridging certificate comprises data selected from the following: a bridge name field; a bridge public key field; a validity period field; a foreign certification authority public key field; a constraints field; a DCA name filed; and a signature field.

3. The method of claim 1, wherein the DCA-authorizing certificate comprises data selected from the following: a DCA name field; a DCA public key field; a privileges field; a conditions field; a validity period field; a CA name field; and a CA signature field.

4. The method of claim 1, wherein the DCA node device can access a predetermined set of trust anchors and a corresponding set of signed certificates received from a plurality of organizations participating in the ad hoc wireless network.

5. The method of claim 4, wherein each organization in the plurality of organizations has granted a DCA-authorizing certificate to the DCA node device, whereby the DCA node device is delegated authority to provide a limited proxy certification authority service on behalf of an organization.

6. The method of claim 1, wherein the DCA node device can function as a master trust bridge in the ad hoc wireless network.

7. The method of claim 1, wherein the DCA node device authorizes the second node device to use a private key of the second node device to facilitate a trust bridging service.

8. The method of claim 1, further comprising, before authenticating the second node device at the DCA node device, processing at the DCA node device a bridging request message received from the second node device.

9. The method of claim 1, wherein the context information comprises network state information, and determining at the DCA node device, based on the context information, that a second node device should be enabled as a new trust bridge employs a predetermined policy based on the network state information.

10. The method of claim 9, wherein the network state information comprises attributes of a node device.

11. The method of claim 9, wherein the network state information comprises network topology data.

12. The method of claim 9, wherein the network state information comprises a plurality of bridging requests.

13. A delegate certification authority (DCA) node device for deploying a trust bridge in an ad hoc wireless network, the DCA node device comprising:
    a processor;
    a network interface communicatively coupled to the processor;
    wherein, the network interface is configured to receive authorizations from a plurality of certification authorities (CAs) of different organizations, wherein the authorizations authorize the DCA node device to serve as a DCA representing the CAs;
    the processor is configured to process authorizations received from the plurality of certification authorities (CAs) of different organizations;
    the network interface is configured to receive context information from the ad hoc wireless network;
    the processor is configured to determine, based on the received context information, that a second node device should be enabled as a new trust bridge, wherein the trust bridge operates to provide interoperability for multi-organizational authentication; and
    the processor is configured to perform a trust bridge deployment to enable the second node device to serve as the new trust bridge;
    the network interface is configured to communicate with the new trust bridge for the trust bridge deployment;
    wherein the processor is further configured to:
    authenticate the second node device;
    determine that the second node device has authenticated the DCA node device:
    determine that the second node device is authorized to function as the trust bridge;
    transmit a bridging certificate from the DCA node device to the second node device; and
    transmit a DCA-authorizing certificate from the DCA node device to the second node device, whereby the second node device is authorized to function as the trust bridge in the ad hoc wireless network.

14. The DCA node device of claim 13, wherein the bridging certificate comprises data selected from the following: a bridge name field; a bridge public key field; a validity period field; a foreign certification authority public key field; a constraints field; a DCA name filed; and a signature field.

15. The DCA node device of claim 13, wherein the DCA-authorizing certificate comprises data selected from the following: a DCA name field; a DCA public key field; a privileges field; a conditions field; a validity period field; a CA name field; and a CA signature field.

16. The DCA node device of claim 13, wherein the DCA node device can access a predetermined set of trust anchors and a corresponding set of signed certificates received from a plurality of organizations participating in the ad hoc wireless network.

17. The DCA node device of claim 16, wherein each organization in the plurality of organizations has granted a DCA-authorizing certificate to the DCA node device, whereby the DCA node device is delegated authority to provide a limited proxy certification authority service on behalf of an organization.

18. The DCA node device of claim 13, wherein the context information comprises network state information, and determining at the DCA node device, based on the context information, that a second node device should be enabled as a new trust bridge employs a predetermined policy based on the network state information.

* * * * *